United States Patent
Ryu et al.

(10) Patent No.: US 10,691,527 B2
(45) Date of Patent: Jun. 23, 2020

(54) SYSTEM INTERCONNECT AND SYSTEM ON CHIP HAVING THE SAME

(71) Applicant: SAMSUNG ELECTRONICS CO., LTD., Suwon-si, Gyeonggi-do (KR)

(72) Inventors: Sueng-Chul Ryu, Hwaseong-si (KR); Bo-Eok Seo, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 100 days.

(21) Appl. No.: 15/821,406

(22) Filed: Nov. 22, 2017

(65) Prior Publication Data

US 2018/0157553 A1   Jun. 7, 2018

(30) Foreign Application Priority Data

Dec. 1, 2016 (KR) .................. 10-2016-0162909

(51) Int. Cl.
| | |
|---|---|
| *G06F 11/00* | (2006.01) |
| *G06F 11/07* | (2006.01) |
| *G06F 13/364* | (2006.01) |
| *G06F 13/42* | (2006.01) |
| *G06F 11/34* | (2006.01) |
| *G06F 11/30* | (2006.01) |

(52) U.S. Cl.
CPC ........ *G06F 11/0793* (2013.01); *G06F 11/079* (2013.01); *G06F 11/0736* (2013.01); *G06F 11/0751* (2013.01); *G06F 11/0772* (2013.01); *G06F 11/3013* (2013.01); *G06F 11/3495* (2013.01); *G06F 13/364* (2013.01); *G06F 13/4282* (2013.01); *G06F 11/3476* (2013.01)

(58) Field of Classification Search
CPC ............ G06F 11/0793; G06F 11/0736; G06F 11/079; G06F 11/0751; G06F 11/3495; G06F 11/3013; G06F 13/4282; G06F 13/364
USPC .......................................... 714/15
See application file for complete search history.

(56) References Cited

U.S. PATENT DOCUMENTS

| | | |
|---|---|---|
| 5,845,097 A | 12/1998 | Kang et al. |
| 5,864,656 A | 1/1999 | Park |
| 6,496,890 B1 | 12/2002 | Azevedo et al. |
| 6,591,360 B1 * | 7/2003 | Soltis, Jr. .............. G06F 9/3824 712/219 |
| 7,219,178 B2 | 5/2007 | Harris et al. |

(Continued)

OTHER PUBLICATIONS

Wikipedia "Application specific integrated circuit" page from date Nov. 14, 2016, reterieved using the WayBackMachine from https://en.wikipedia.org/wiki/Application-specific_integrated_circuit (Year: 2016).*

(Continued)

*Primary Examiner* — Yair Leibovich
(74) *Attorney, Agent, or Firm* — Volentine, Whitt & Francos, PLLC

(57) ABSTRACT

A system on chip (SoC) includes a bus matrix configured to connect a plurality of functional blocks. A monitoring unit is configured to monitor whether a transaction between the functional blocks has a hang or stall and distinguish a functional block that caused a hang or stall from among the functional blocks. A recovery signal generation unit is configured to provide a recovery signal for releasing the hang or stall to at least one of the functional blocks based on the distinguishing by the monitoring unit.

19 Claims, 15 Drawing Sheets

(56) References Cited

U.S. PATENT DOCUMENTS

| | | | |
|---|---|---|---|
| 7,234,011 B2 | 6/2007 | Chae | |
| 7,343,476 B2 * | 3/2008 | Floyd | G06F 9/3012 712/216 |
| 7,484,131 B2 | 1/2009 | Fields, Jr. et al. | |
| 7,558,895 B2 | 7/2009 | Bruce | |
| 7,725,685 B2 * | 5/2010 | Floyd | G06F 9/3012 712/216 |
| 7,900,096 B2 | 3/2011 | Cardwell et al. | |
| 8,171,186 B1 | 5/2012 | Karguth et al. | |
| 8,554,967 B2 | 10/2013 | Deshpande | |
| 9,141,488 B1 | 9/2015 | Jahnke | |
| 2006/0075169 A1 * | 4/2006 | Harris | G06F 13/364 710/110 |
| 2007/0101043 A1 | 5/2007 | Herman | |
| 2007/0220513 A1 | 9/2007 | Hwang | |
| 2012/0089758 A1 | 4/2012 | Yun et al. | |
| 2013/0191572 A1 | 7/2013 | Nooney et al. | |
| 2014/0086246 A1 | 3/2014 | Boucard et al. | |
| 2014/0281695 A1 * | 9/2014 | Kraipak | G06F 11/0721 714/10 |
| 2015/0058660 A1 | 2/2015 | Baker | |
| 2015/0235338 A1 | 8/2015 | Alla et al. | |
| 2017/0269984 A1 * | 9/2017 | Idapalapati | G06F 11/0757 |
| 2018/0074875 A1 * | 3/2018 | Becht | G06F 11/0757 |

OTHER PUBLICATIONS

Wikipedia "Bus" page as definition, retrieved from htttps://en.wikipedia.org/wiki/Bus_(computing) (Year: 2019).*

Wikipedia Hang page as definition, retrieved from https://en.wikipedia.org/wiki/Hang_(computing) (Year: 2019).*

Wikipedia "That" page as definition, retrieved from https://en.wikipedia.org/wiki/That (Year: 2019).*

Wikipedia "Communication_channel" page as definition, retrieved from https://en.wikipedia.org/wiki/Communication_channel (Year: 2019).*

* cited by examiner

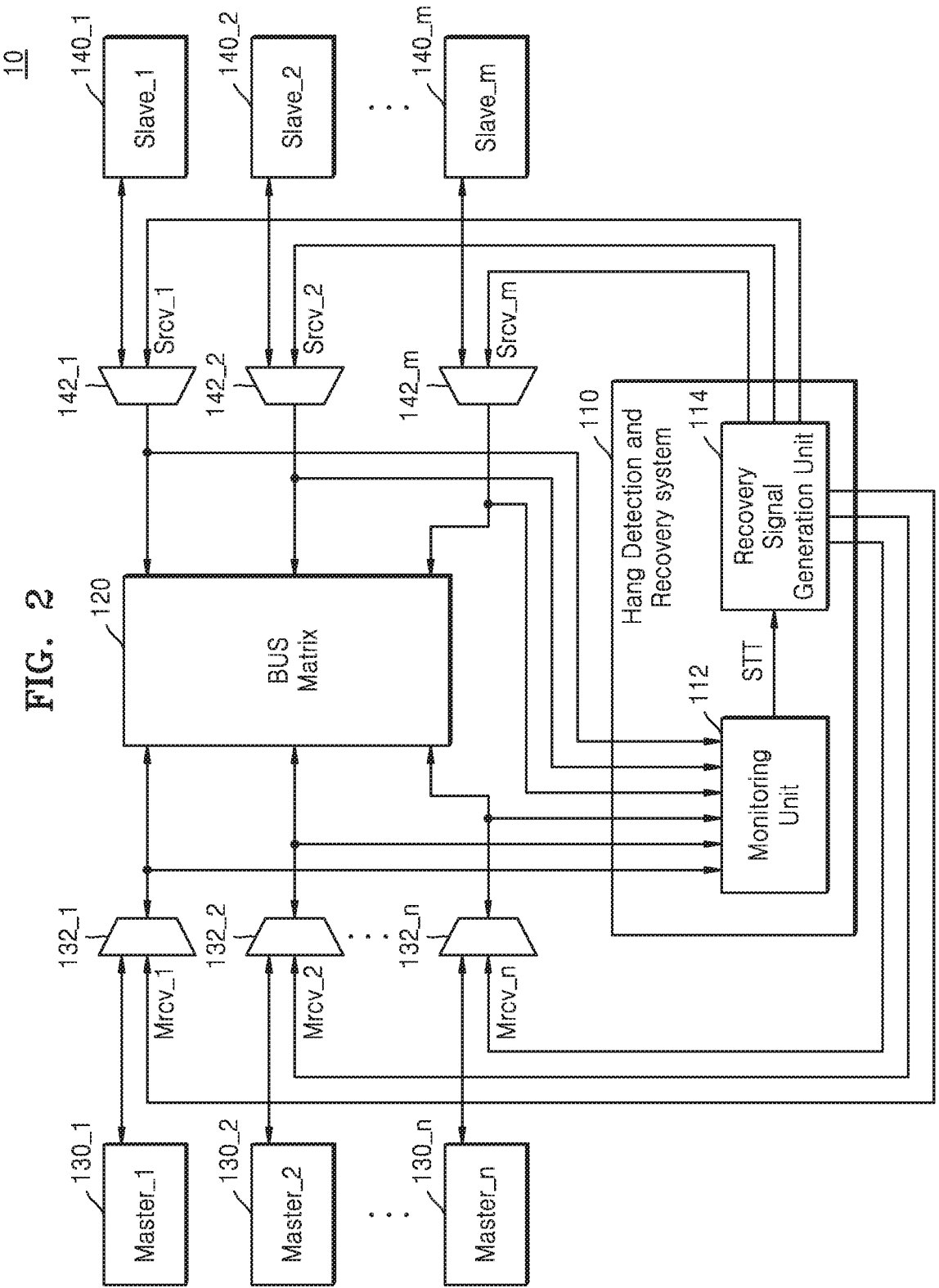

SYSTEM INTERCONNECT AND SYSTEM ON CHIP HAVING THE SAME

CROSS-REFERENCE TO RELATED APPLICATION

This application claims the benefit of Korean Patent Application No. 10-2016-0162909, filed on Dec. 1, 2016, in the Korean Intellectual Property Office, the disclosure of which is incorporated herein in its entirety by reference.

BACKGROUND

The disclosure relates to a System on Chip (SoC), and more particularly, to an SoC that supports interconnects that can release hangs or stalls.

The SoC is related to technology for integrating complex systems having various functions into a single semiconductor chip. Demands for application specific ICs (ASICs) and application specific standard products (ASSPs) have shifted to the SoC as a result of convergence trends in which computers, communications, and broadcasts are integrated. In addition, a trend toward smaller and lighter Information Technology (IT) devices is promoting SoC-related businesses.

For effective design of the SoC, the choice of interconnects for mutual communication among a plurality of functional blocks integrated on one chip is of the utmost importance. As interconnect performance improves, development time is reduced in a product development stage and the overall operating performance of the SoC is improved. Thus, there is a continuing need for interconnects with improved operating performance.

SUMMARY

The disclosure provides a system interconnect having improved operating performance and a System on Chip (SoC) including the same.

According to an aspect of the disclosure, there is provided an SoC including a BUS matrix configured to connect a plurality of functional blocks; a monitoring unit configured to monitor whether a transaction between the functional blocks has a hang or stall and distinguish a functional block that caused the hang or stall from among the functional blocks; and a recovery signal generation unit configured to provide a recovery signal for releasing the hang or stall to at least one of the functional blocks based on the distinguished functional block.

According to an aspect of the disclosure, there is provided a system interconnect including at least one channel configured to transmit a plurality of signals between one or more master blocks and one or more slave blocks; a monitoring unit configured to determine whether a hang or stall has occurred in the channel and distinguish a functional block that caused the hang or stall from among the one or more master blocks and the one or more slave blocks; and a recovery signal generation unit configured to provide a recovery signal for releasing the hang or stall to a target functional block of the distinguished functional block.

According to an aspect of the disclosure, there is provided a system on chip having a bus matrix, a monitoring device, and a recovery device. The bus matrix interconnects a plurality of functional blocks through dynamically configurable channels. The monitoring device detects the absence of an expected signal and identifies the particular functional block, among the functional blocks, that was to communicate the expected signal to a target functional block, among the functional blocks. And the recovery device communicates a recovery signal to the target functional block through the same channel within the bus matrix that the expected signal was to be communicated to the target functional block by the particular functional block.

BRIEF DESCRIPTION OF THE DRAWINGS

Example embodiments of the disclosure will be more clearly understood from the following detailed description taken in conjunction with the accompanying drawings in which:

FIG. 2 is a specific block diagram of a semiconductor chip according to an example embodiment of the disclosure;

DETAILED DESCRIPTION OF THE EMBODIMENTS

Figure 1:
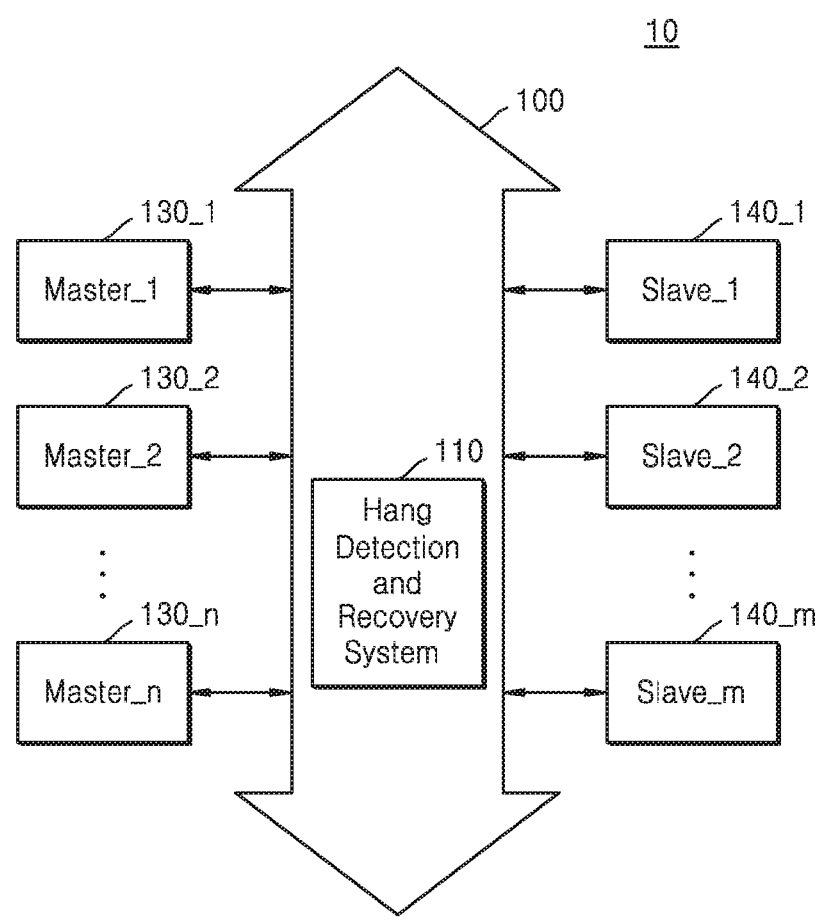
FIG. 1 is a block diagram of a semiconductor chip according to an example embodiment of the disclosure.

FIG. 1 is a block diagram of a semiconductor chip 10 according to an example embodiment of the disclosure.

Referring to FIG. 1, the semiconductor chip 10 may include an interconnect 100, a plurality of master blocks 130_1 to 130_n, and a plurality of slave blocks 140_1 to 140_m. The semiconductor chip 10 may be, for example, a System on Chip (SoC). Each of the master blocks 130_1 to 130_n and the slave blocks 140_1 to 140_m may be implemented in the SoC to perform a specific function. The master blocks 130_1 to 130_n and the slave blocks 140_1 to 140_m may be classified based on whether or not they have authority to use the interconnect 100.

The master blocks 130_1 to 130_n may access the slave blocks 140_1 to 140_m through the interconnect 100. The master blocks 130_1 to 130_n may include, for example, a central processing unit (CPU), a graphics processing unit (GPU), a micro-controller, a direct memory access (DMA), a digital signal processor (DSP), or a universal serial bus (USB).

The slave blocks 140_1 to 140_m may be controlled by the master blocks 130_1 to 130_n through the interconnect 100. The slave blocks 140_1 to 140_m may include, for example, a memory, a memory controller, or the like.

The interconnect 100 may connect the master blocks 130_1 to 130_n and the slave blocks 140_1 to 140_m. For example, the interconnect 100 may include a read-address (AR) channel, a write-address (AW) channel, a write-response (B) channel, a read-response (R) channel, or a write-data (W) channel.

The interconnect 100 may be implemented as a bus using a protocol having a standard bus specification. For example, an Advanced Microcontroller Bus Architecture (AMBA) protocol of an Advanced RISC Machine (ARM) may be applied as a standard bus specification. A bus type of the AMBA protocol may include an Advanced High-Performance Bus (AHB), an Advanced Peripheral Bus (APB), an Advanced Extensible Interface (AXI), an AXI4, or AXI Coherency Extensions (ACE). From among the bus types described above, the AXI is an interface protocol between functional blocks, providing multiple outstanding address functions and data interleaving functions. In addition, other types of protocols may be applied to the interconnect 100, such as uNetwork of SONICs Inc., CoreConnect of IBM, and an open-core protocol of OCP-IP.

The interconnect 100 may include a hang detection and recovery system 110. However, the disclosure is not limited thereto, and the hang detection and recovery system 110 may be located outside the interconnect 100.

In an example embodiment, the hang detection and recovery system 110 may monitor whether a transaction between at least one of the master blocks 130_1 to 130_n and at least one of the slave blocks 140_1 to 140_m has a hang or stall. For example, the hang detection and recovery system 110 may determine whether a hang or stall has occurred between at least one of the master blocks 130_1 to 130_n and the interconnect 100, or between at least one of the slave blocks 140_1 to 140_m and the interconnect 100. The hang or stall may occur, for example, when at least one of the master blocks 130_1 to 130_n becomes inoperable or at least one of the slave blocks 140_1 to 140_m becomes unresponsive, due to an external factor.

In an example embodiment, the hang detection and recovery system 110 may distinguish a functional block that caused a hang or stall from among the master blocks 130_1 to 130_n and the slave blocks 140_1 to 140_m. The hang detection and recovery system 110 may release a hang or stall by providing a recovery signal to the functional block that caused a hang or stall when a hang or stall has occurred.

FIG. 2 is a specific block diagram of the semiconductor chip 10 according to an example embodiment of the disclosure.

Referring to FIG. 2, the semiconductor chip 10 may include a BUS matrix 120, a plurality of master multiplexers 132_1 to 132_n, and a plurality of slave multiplexers 142_1 to 142_m. The semiconductor chip 10 may include a hang detection and recovery system 110, and the hang detection and recovery system 110 may include a monitoring unit 112 and a recovery signal generation unit 114.

The BUS matrix 120 may include at least one channel configured to transmit a plurality of signals between at least one of the master blocks 130_1 to 130_n and at least one of the slave blocks 140_1 to 140_m. In an example embodiment, the BUS matrix 120 may include a plurality of interfaces and a plurality of nodes.

The monitoring unit 112 included in the hang detection and recovery system 110 may monitor whether a transaction between at least one of the master blocks 130_1 to 130_n and at least one of the slave blocks 140_1 to 140_m has a hang or stall. The monitoring unit 112 may determine whether a hang or stall has occurred between at least one of the master blocks 130_1 to 130_n and the BUS matrix 120, or between at least one of the slave blocks 140_1 to 140_m and the BUS matrix 120. The monitoring unit 112 may monitor a request signal output from at least one of the master blocks 130_1 to 130_n to determine whether a hang or stall has occurred. The monitoring unit 112 may monitor a response signal output from at least one of the slave blocks 140_1 to 140_m to determine whether a hang or stall has occurred.

For example, the BUS matrix 120 may include an AR channel and/or an AW channel defined in the AXI4 protocol. Here, the request signal may include AWRITE, ADPATH, ARPATH, AID, ADDR, AADDR, ALEN, ASIZE, ABURST, ALOCK, ACACHE, APROT, AQOS, AUSER, or AVALID and the response signal may include AREADY. AWRITE may be a signal indicating a write request or a read request, ADPATH may be a signal indicating a decoding path, and ARPATH may be a signal indicating a return path. AID may be a signal indicating a transaction identifier, ADDR may be a signal indicating an address, and AADDR may be a signal indicating a start address of a burst operation. ALEN may be a signal indicating a burst length, ASIZE may be a signal indicating a burst size, and ABURST may be a signal indicating a burst type. ALOCK may be a signal indicating a lock type, ACACHE may be a signal indicating a memory type, and APROT may be a signal indicating a protection type. AQOS may be a signal indicating service quality, AUSER may be a user signal, and AVALID may be a signal indicating address validity. AREADY may be a signal indicating address ready.

For example, the BUS matrix 120 may include the B channel defined in the AXI4 protocol. Here, the request signal may include BREADY, and the response signal may include BRPATH, BID, BRESP, BUSER, or BVALID. BREADY may be a signal indicating whether a master block or master node is able to receive a write response. BRPATH may be a signal indicating a return path, BID may be a signal indicating a write response, and BRESP may be a signal indicating a state of a write transaction. BUSER may be a user signal, and BVALID may be a signal indicating whether there is a write response to be transmitted from a slave block or slave node.

For example, the BUS matrix 120 may include the R channel defined in the AXI4 protocol. Here, the request signal may include RREADY, and the response signal may include RRPATH, RID, RDATA, RRESP, RLAST, RUSER, or RVALID. RREADY may be a signal indicating whether a master block or master node is able to receive a write response. RRPATH may be a signal indicating a return path, RID may be a signal indicating a read response, and RDATA may be a signal indicating read data. RRESP may be a signal indicating a read transmission state, and RLAST may be a signal indicating the last transmission in a read burst operation. RUSER may be a user signal, and RVALID may be a signal indicating whether there is a read response to be transmitted from a slave block or slave node.

For example, the BUS matrix 120 may include the W channel defined in the AXI4 protocol. Here, the request signal may include WDPATH, WRPATH, WDATA, WSTRB, WLAST, WUSER, or WVALID and the response signal may include WREADY. WDPATH may be a signal indicating a decoding path, WRPATH may be a signal indicating a return path, and WDATA may be a signal indicating write data. WSTRB may be a write strobe signal, e.g., a signal indicating which byte lane has valid data. WLAST may be a signal indicating the last transmission in a write burst operation, and WUSER may be a user signal. WVALID may be a signal indicating that write data and a strobe signal to be transmitted from a master block or master node exist. WREADY may be a signal indicating whether a slave block or slave node is able to receive write data.

In an example embodiment, the monitoring unit 112 may determine whether each of the master blocks 130_1 to 130_n is transacted through the request signal and whether each of the slave blocks 140_1 to 140_m is responsive through the response signal. The monitoring unit 112 may respectively compare counts of the transaction status and the response status to determine whether a hang or a stall has occurred. In another example embodiment, the monitoring unit 112 may monitor the request signal or the response signal for a predetermined period of time to determine whether the signal is LOW or HIGH, and may determine whether a hang or stall has occurred based on the determination.

When the monitoring unit 112 determines that a hang or stall has occurred, the monitoring unit 112 may distinguish a functional block that caused the hang or stall. In an example embodiment, the monitoring unit 112 may distinguish the functional block that caused a hang or stall based on a protocol of an interface included in the BUS matrix 120.

For example, when the first master block 130_1 performs a transaction that does not conform to the protocol of the interface included in the BUS matrix 120, the monitoring unit 112 may determine that the first master block 130_1 is a functional block that caused a hang or stall. For example, when the first master block 130_1 performs a transaction conforming to the protocol but a first slave block 140_1, which is a 'target functional block', fails to respond, the monitoring unit 112 may distinguish that the first slave block 140_1 is a functional block that caused a hang or stall. The 'target functional block' may mean, for example, a target block of a data transaction or a target block of a response signal. For example, when the first master block 130_1 transmits a request signal to the first slave block 140_1 to perform a data transaction, a target functional block of the first master block 130_1 may be the first slave block 140_1. For example, when the first slave block 140_1 outputs a response signal in response to a request signal of the first master block 130_1, a target functional block of the first slave block 140_1 may be the first master block 130_1.

The monitoring unit 112 may distinguish a functional block that caused a hang or stall and then output a status information signal STT to the recovery signal generation unit 114. In an example embodiment, a status information signal STT may include information on whether or not a hang or stall has occurred and/or information about a hang or stall-causing functional block.

Based on the status information signal STT output from the monitoring unit 112, the recovery signal generation unit 114 may provide master recovery signals Mrcv_1 to Mrcv_n for releasing a hang or stall to at least one of the slave blocks 140_1 to 140_m. Furthermore, based on the status information signal STT output from the monitoring unit 112, the recovery signal generation unit 114 may provide slave recovery signals Srcv_1 to Srcv_m for releasing a hang or stall to at least one of the master blocks 130_1 to 130_n.

In an example embodiment, the recovery signal generation unit 114 may provide the master recovery signals Mrcv_1 to Mrcv_n to at least one of the slave blocks 140_1 to 140_m through the BUS matrix 120. For example, when the target functional block of the first master block 130_1 is the first slave block 140_1 and the status information signal STT includes information indicating that a functional block that caused a hang or stall is the first master block 130_1, the recovery signal generation unit 114 may provide the first master recovery signal Mrcv_1 to the first slave block 140_1 through the first master multiplexer 132_1, the BUS matrix 120, and the first slave multiplexer 142_1.

In an example embodiment, the recovery signal generation unit 114 may provide the slave recovery signals Srcv_1 to Srcv_m to at least one of the master blocks 130_1 to 130_n through the BUS matrix 120. For example, when the target functional block of the first slave block 140_1 is the first master block 130_1 and the status information signal STT includes information indicating that a functional block that caused a hang or stall is the first slave block 140_1, the recovery signal generation unit 114 may provide the first slave recovery signal Srcv_1 to the first master block 130_1 through the first slave multiplexer 142_1, the BUS matrix 120, and the first master multiplexer 132_1.

Each of the master multiplexers 132_1 to 132_n may be electrically connected to the recovery signal generation unit 114, the BUS matrix 120, and each of the master blocks 130_1 to 130_n. One end of each of the master multiplexers 132_1 to 132_n may be connected to the BUS matrix 120 and the other end may be connected to the recovery signal generation unit 114 and each of the master blocks 130_1 to 130_n.

The master multiplexers 132_1 to 132_n may receive output signals of the master blocks 130_1 to 130_n corresponding to the respective master blocks 130_1 to 130_n and may output signals to the respective master blocks 130_1 to 130_n. The master multiplexers 132_1 to 132_n may receive the output signals of the corresponding master blocks 130_1 to 130_n and the master recovery signals Mrcv_1 to Mrcv_n output from the recovery signal generation unit 114 and may alternatively determine outputs. The output signals of the master blocks 130_1 to 130_n may be request signals for one of the slave blocks 140_1 to 140_m, respectively. Although not shown, the master multiplexers 132_1 to 132_n may determine outputs based on, for example, an enable signal output from the recovery signal generation unit 114.

Each of the slave multiplexers 142_1 to 142_m may be electrically connected to the recovery signal generation unit 114, the BUS matrix 120, and each of the slave blocks 140_1 to 140_m. One end of each of the slave multiplexers 142_1 to 142_m may be connected to the BUS matrix 120 and the other end may be connected to the recovery signal generation unit 114 and each of the slave blocks 140_1 to 140_m.

The slave multiplexers 142_1 to 142_m may receive output signals of the slave blocks 140_1 to 140_m corresponding to the respective slave blocks 140_1 to 140_m and may output signals to the respective slave blocks 140_1 to 140_m. The slave multiplexers 142_1 to 142_m may receive the output signals of the corresponding slave blocks 140_1 to 140_m and the slave recovery signals Srcv_1 to Srcv_m output from the recovery signal generation unit 114 and may alternatively determine outputs. Each of the output signals of the slave blocks 140_1 to 140_*m* may be a response signal in response to a request from one of the master blocks 130_1 to 130_*n*. Although not shown, the slave multiplexers 142_1 to 142_*m* may determine outputs based on, for example, an enable signal output from the recovery signal generation unit 114.

Figure 3A:
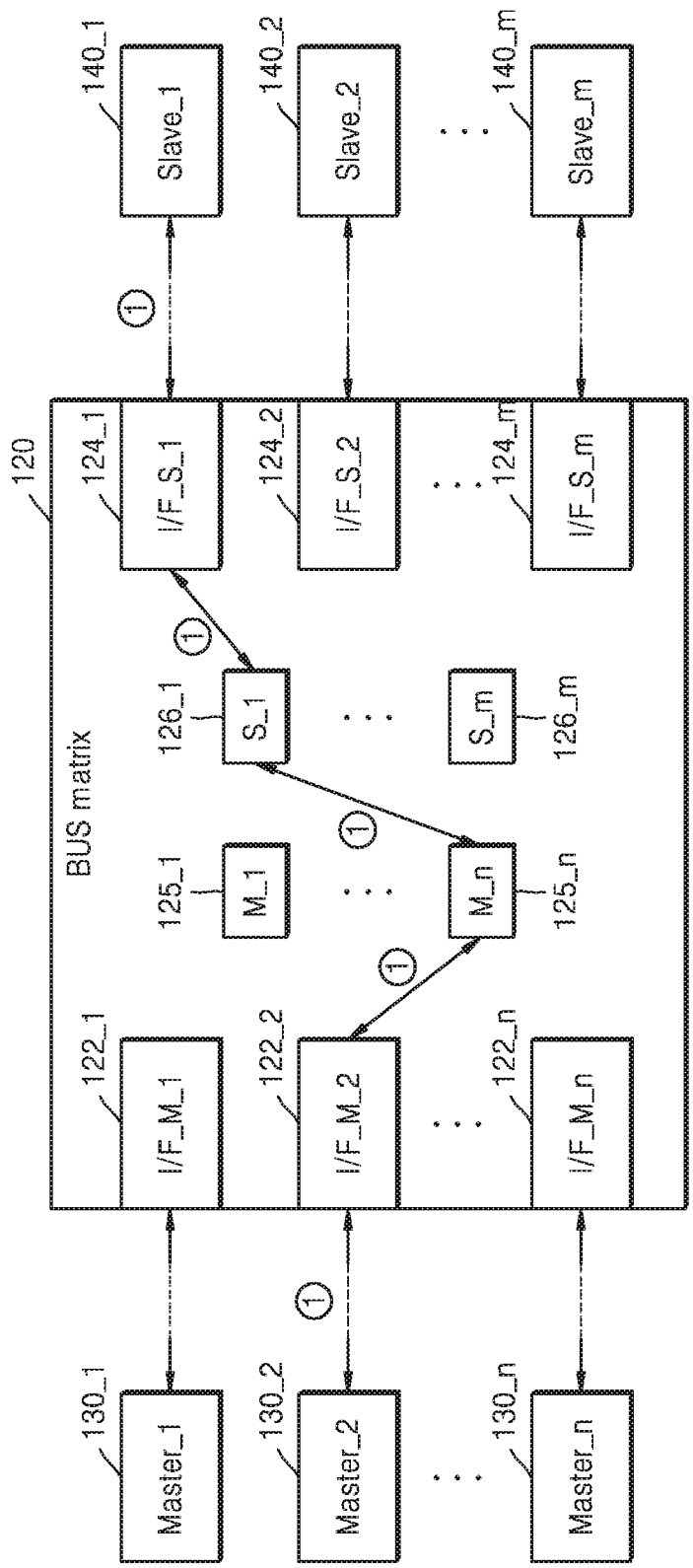
FIG. 3A is a view illustrating a data transaction according to an example embodiment of the disclosure.
Figure 3B:
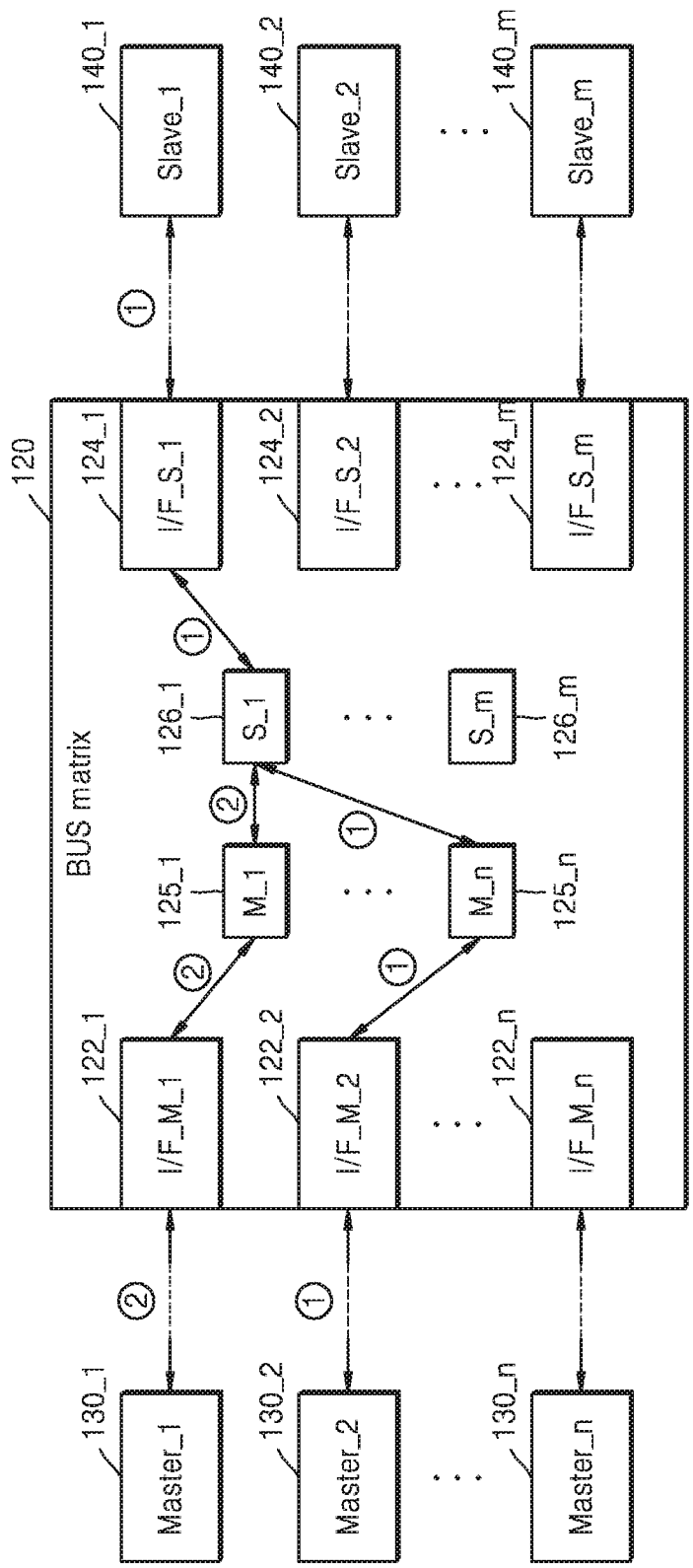
FIG. 3B is a view illustrating a data transaction of another functional block when a hang or stall occurs, according to an example embodiment of the disclosure.

FIG. 3A is a view illustrating a data transaction according to an example embodiment of the disclosure, and FIG. 3B is a view illustrating a data transaction of another functional block when a hang or stall has occurred, according to an example embodiment of the disclosure.

Referring to FIG. 3A, the BUS matrix 120 may include a plurality of master interfaces 122_1 to 122_*n*, a plurality of master switch nodes 125_1 to 125_*n*, a plurality of slave switch nodes 126_1 to 126_*m*, and a plurality of slave interfaces 124_1 to 124_*m*. The master interfaces 122_1 to 122_*n* and/or the slave interfaces 124_1 to 124_*m* may be provided with, for example, an AXI, AHB, or APB interface protocol. For convenience of explanation, an interface connected to the master blocks 130_1 to 130_*n* is referred to as a master interface and an interface connected to the slave blocks 140_1 to 140_*m* is referred to as a slave interface, based on a subject of a data flow. However, the disclosure is not limited thereto.

For example, the second master block 130_2 may transmit data to the first slave block 140_1 as a target functional block. A request signal output from the second master block 130_2 may be transmitted to the first slave block 140_1 through the second master interface 122_2, the $n^{th}$ master switch node 125_*n*, the first slave switch node 126_1, and the first slave interface 124_1. However, this is only for convenience of explanation and the request signal output from the second master block 130_2 may be transmitted to the first slave block 140_1 further through a plurality of nodes (not shown).

When a normal operation is performed, the first slave block 140_1 receiving the request signal output from the second master block 130_2 may output a response signal to the request signal. The response signal of the first slave block 140_1 may be transmitted to the second master block 130_2 through, e.g., the first slave interface 124_1, the first slave switch node 126_1, the $n^{th}$ master switch node 125_*n*, and the second master interface 122_2.

However, for example, when a normal operation is not performed due to external factors, the first slave block 140_1 may not output a response signal. In this case, the request signal output from the second master block 130_2 may be pending in the BUS matrix 120, and the first slave interface 124_1, the first slave switch node 126_1, and the $n^{th}$ master switch node 125_*n* may maintain a standby state corresponding to a response of the first slave block 140_1.

Referring to FIG. 3B, a data transaction of the first master block 130_1 may be performed in a state where the hang or stall that occurred in FIG. 3A is not released. When a normal operation is performed, a request signal output from the first master block 130_1 may be transmitted to one functional block from among the slave blocks 140_1 to 140_*m* through, e.g., the first master interface 122_1, the first master switch node 125_1, the first slave switch node 126_1, and the second slave interface 124_2.

However, when a normal operation is not performed, for example, when the hang or stall occurring in FIG. 3A is not released, the data transaction of the first master block 130_1 may have a hang or stall. In more detail, the first slave switch node 126_1 maintains a standby state with respect to the response of the first slave block 140_1 while the first slave block 140_1 does not output a response signal, and the request signal of the first master block 130_1 may not be transmitted to the first slave switch node 126_1 from the first master switch node 125_1 and may be pending in the first master switch node 125_1.

When a hang or stall has occurred as described above, an SoC according to an example embodiment of the disclosure may provide a recovery signal to release a hang or stall to a target functional block of a functional block that caused a hang or stall. Thus, when a hang or stall has occurred, the hang or stall may be released without transferring responsibility to functional blocks. In addition, when a defect has occurred, it is possible to shorten a development period of a chip by improving a difficulty in performing debugging due to a hang or stall.

Figure 4:
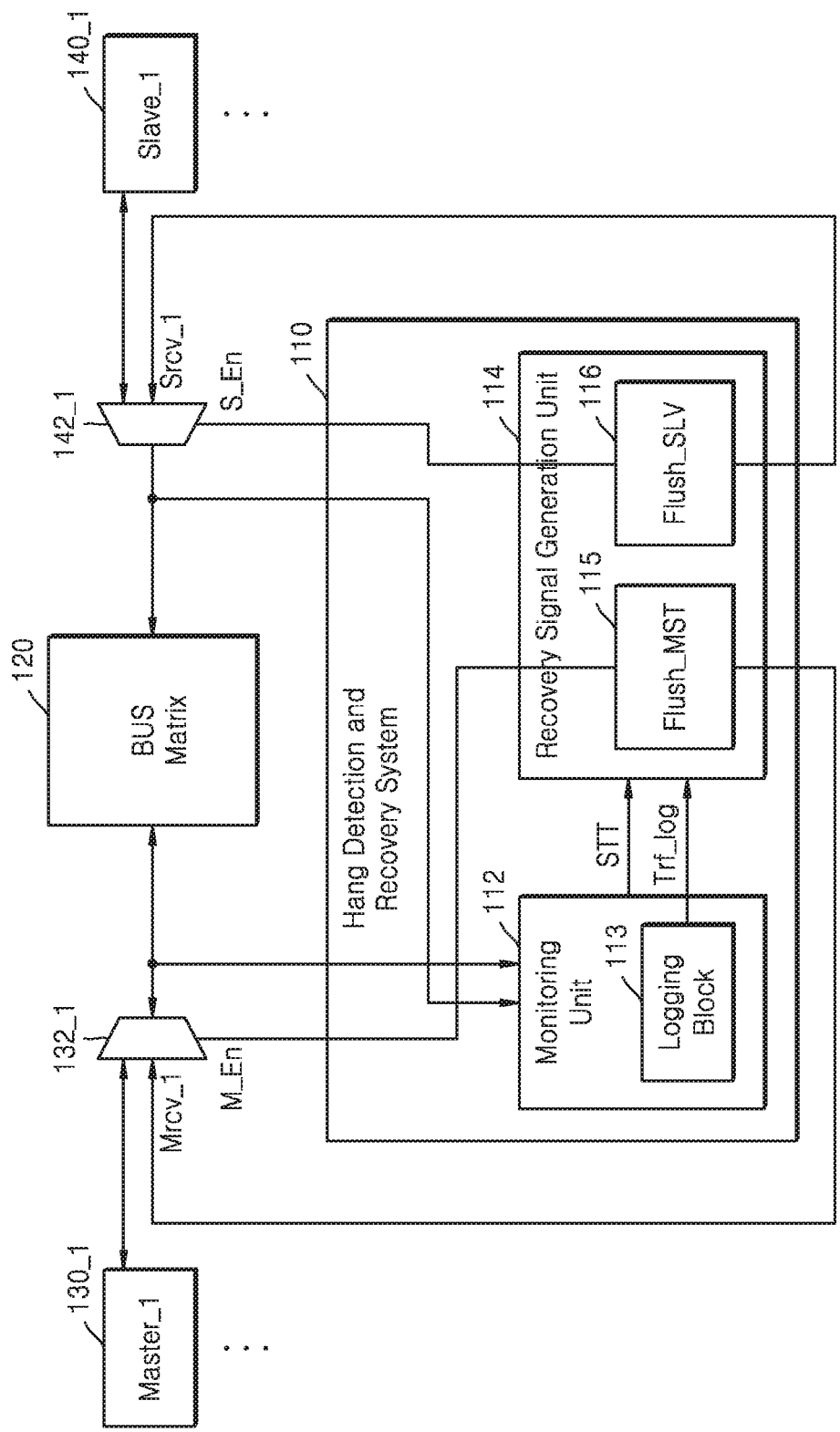
FIG. 4 is a view of a specific configuration of a hang detection and recovery system and generation of a recovery signal, according to an example embodiment of the disclosure.

FIG. 4 is a view of a specific configuration of a hang detection and recovery system 110 and generation of a recovery signal, according to an example embodiment of the disclosure. Referring to FIG. 4, the monitoring unit 112 included in the hang detection and recovery system 110 may include a logging block 113, and the recovery signal generation unit 114 may include a master recovery unit 115 and a slave recovery unit 116. Although FIG. 4 shows only the first master block 130_1, the first master multiplexer 132_1, the first slave multiplexer 142_1, and the first slave block 140_1, this is only for convenience of explanation and the disclosure is not limited thereto.

The master recovery unit 115 may output the first master recovery signal Mrcv_1 to the first master multiplexer 132_1. In addition, the master recovery unit 115 may output a master enable signal M_En to the first master multiplexer 132_1. The first master multiplexer 132_1 may output one of the request signal of the first master block 130_1 and the first master recovery signal Mrcv_1 to the BUS matrix 120 based on the master enable signal M_En.

The slave recovery unit 116 may output the first slave recovery signal Srcv_1 to the first slave multiplexer 142_1. In addition, the slave recovery unit 116 may output a slave enable signal S_En to the first slave multiplexer 142_1. The first slave multiplexer 142_1 may output one of the response signal of the first slave block 140_1 and the first slave recovery signal Srcv_1 to the BUS matrix 120 based on the slave enable signal S_En.

The logging block 113 may log and store signals transmitted between the master blocks 130_1 to 130_*n* and the slave blocks 140_1 to 140_*m* and may output stored logging information Trf_log to the recovery signal generation unit 114. Signals transmitted between the master blocks 130_1 to 130_*n* and the slave blocks 140_1 to 140_*m* may be request signals of the master blocks 130_1 to 130_*n* and/or response signals of the slave blocks 140_1 through 140_*m*. The logging block 113 may include, for example, static random access memory (SRAM) and/or a flip-flop. The logging information Trf_log stored in the logging block 113 may be accessible through, e.g., a port on which debugging is performed. The logging information Trf_log may include information about the current pending signal.

The recovery signal generation unit 114 may specify a recovery signal based on the logging information Trf_log output from the logging block 113. For example, when the target functional block of the first master block 130_1 is the first slave block 140_1 and the first master block 130_1 is a functional block that caused a hang or stall, the master recovery unit 115 may output the first master recovery signal Mrcv_1 to the first master multiplexer 132_1 based on the logging information Trf_log. The first master recovery signal Mrcv_1 may be provided to the first slave block 140_1 through the first master multiplexer 132_1, the BUS matrix 120, and the first slave multiplexer 142_1.

For example, when the target functional block of the first slave block 140_1 is the first master block 130_1 and the first slave block 140_1 is a functional block that caused a hang or stall, the slave recovery unit 116 may output the first slave recovery signal Srcv_1 to the first slave multiplexer 142_1 based on the logging information Trf_log. The first slave recovery signal Srcv_1 may be provided to the first master block 130_1 through the first slave multiplexer 142_1, the BUS matrix 120, and the first master multiplexer 132_1.

Figure 5A:
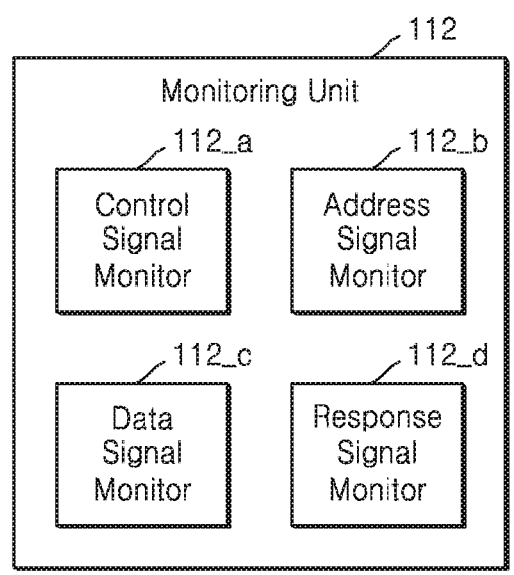
FIG. 5A is a view of a configuration of a monitoring unit according to an example embodiment of the disclosure.
Figure 5B:
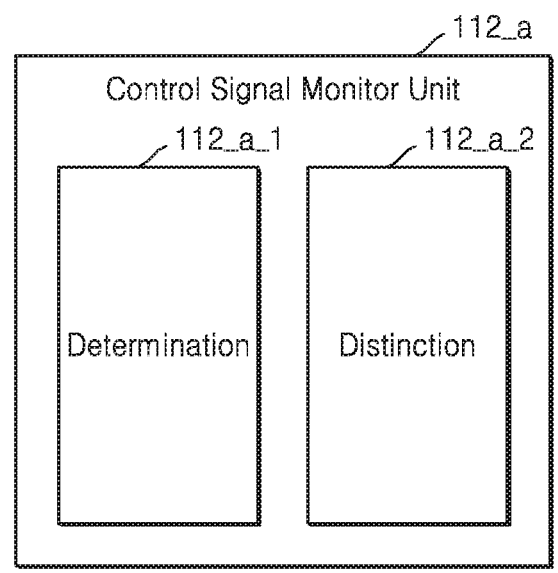
FIG. 5B is a view of a configuration of sub-monitoring units shown in FIG. 5A.

FIG. 5A is a view of a configuration of the monitoring unit 112 according to an example embodiment of the disclosure, and FIG. 5B is a view of a configuration of sub-monitoring units shown in FIG. 5A.

Referring to FIG. 5A, the monitoring unit 112 may include first to fourth sub-monitoring units 112_a to 112_d. Each of the sub-monitoring units 112_a to 112_d may be classified according to a type of a signal to be monitored. In an example embodiment, the first sub-monitoring unit 112_a may monitor a control-related signal, the second sub-monitoring unit 112_b may monitor an address-related signal, the third sub-monitoring unit 112_c may monitor a data-related signal, and the fourth sub-monitoring unit 112_d may monitor a response-related signal.

Referring to FIGS. 2, 5A and 5B, the first sub-monitoring unit 112_a may include a determination unit 112_a_1 and a distinction unit 112_a_2. For convenience of explanation, FIG. 5B shows only the first sub-monitoring unit 112_a. However, the second to fourth sub sub-monitoring units 112_b to 112_d may have the same configuration as the first sub-monitoring unit 112_a.

The determination unit 112_a_1 may determine whether a hang or stall has occurred between the master blocks 130_1 to 130_n and the BUS matrix 120 or between the slave blocks 140_1 to 140_m and the BUS matrix 120. In an example embodiment, the determination unit 112_a_1 may determine whether a master hang or a master stall has occurred based on a request signal or a status signal output from at least one of the master blocks 130_1 to 130_n. In an example embodiment, the determination unit 112_a_1 may determine whether a slave hang or a slave stall has occurred based on a response signal or a status signal output from at least one of the slave blocks 140_1 to 140_m.

If the determination unit 112_a_1 determines that a hang or stall has occurred, the distinction unit 112_a_2 may distinguish a functional block that caused a hang or stall from among the master blocks 130_1 to 130_n and the slave blocks 140_1 to 140_m. In an example embodiment, the distinction unit 112_a_2 may output the status information signal STT including information on a functional block that caused a hang or stall to the recovery signal generation unit 114.

Figure 6:
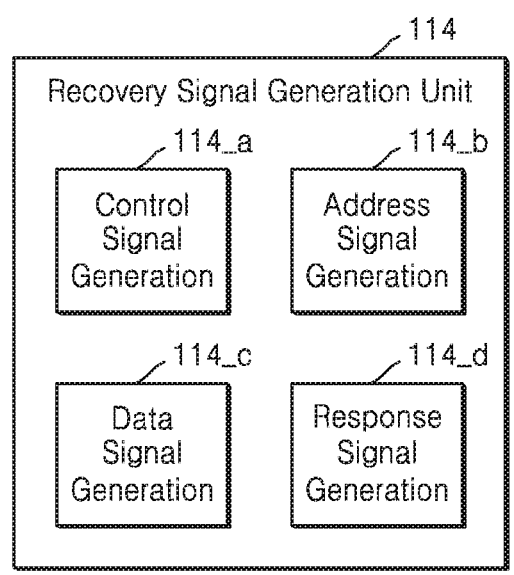
FIG. 6 is a view of a configuration of a recovery signal generation unit according to an example embodiment of the disclosure.

FIG. 6 is a view of a configuration of the recovery signal generation unit 114 according to an example embodiment of the disclosure.

Referring to FIG. 6, the recovery signal generation unit 114 may include first to fourth sub-generation units 114_a to 114_d. Each of the sub-generation units 114_a to 114_d may be classified, e.g., according to a type of a recovery signal to be generated. In an example embodiment, the first sub-generation unit 114_a may generate and output a control-related recovery signal, the second sub-generation unit 114_b may generate and output an address-related recovery signal, the third sub-generation unit 114_c may generate and output a data-related recovery signal, and the fourth sub-generation unit 114_d may generate and output a response-related recovery signal. In another example embodiment, each of the sub-generation units 114_a to 114_d may simply generate and output only a dummy recovery signal.

Figure 7:
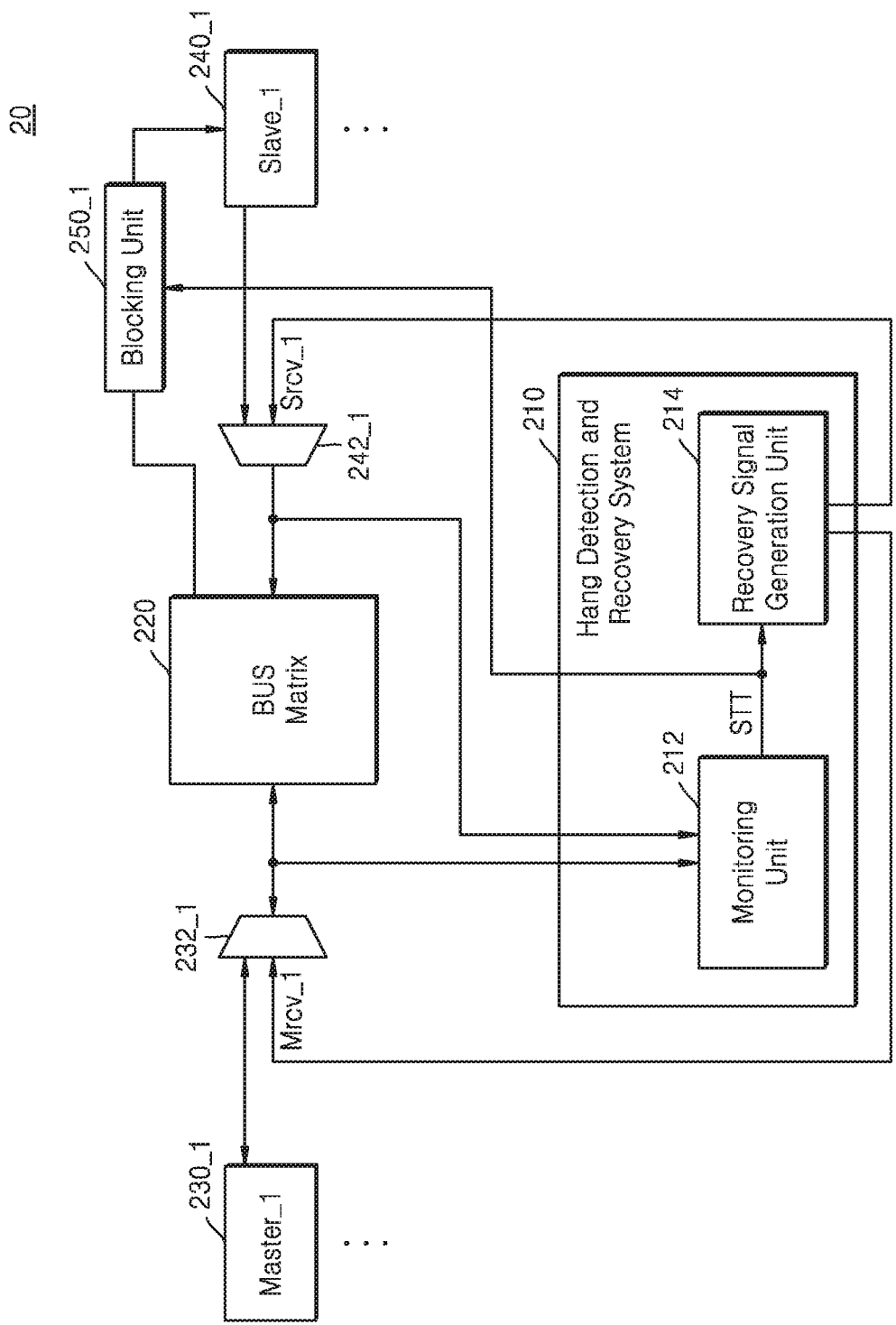
FIG. 7 is a block diagram of a semiconductor chip according to an example embodiment of the disclosure.

FIG. 7 is a block diagram of a semiconductor chip 20 according to an example embodiment of the disclosure.

Referring to FIG. 7, the semiconductor chip 20 may include a blocking unit 250_1. The description of other blocks of the semiconductor chip 20 will be brief, as they are similar to their counterparts illustrated in FIG. 2. FIG. 7 shows a first master block 230_1, a first master multiplexer 232_1, a first slave block 240_1, a first slave multiplexer 242_1, a blocking unit 250_1, a BUS matrix 220, and a hang detection and recovery system 210 having a monitoring unit 212 and a recovery signal generation unit 214. However, the disclosure is not limited thereto.

The blocking unit 250_1 may receive a request signal for the first slave block 240_1 transmitted through a BUS matrix 220 and the status information signal STT output from a monitoring unit 212. The blocking unit 250_1 may block the request signal for the first slave block 240_1 based on the received status information signal STT. The request signal may be, for example, output from the first master block 230_1, or may be output from another functional block (not shown).

For example, when the first slave block 240_1 caused a hang or stall, the monitoring unit 212 may monitor an output of the first slave multiplexer 242_1 to determine whether a hang or stall has occurred, and may distinguish that the first slave block 240_1 is a functional block that caused a hang or stall. The monitoring unit 212 may include information on a hang or stall in the status information signal STT and may output the status information signal STT to the blocking unit 250_1, and the blocking unit 250_1 may block the request signal for the first slave block 240_1 based on the status information signal STT.

Figure 8:
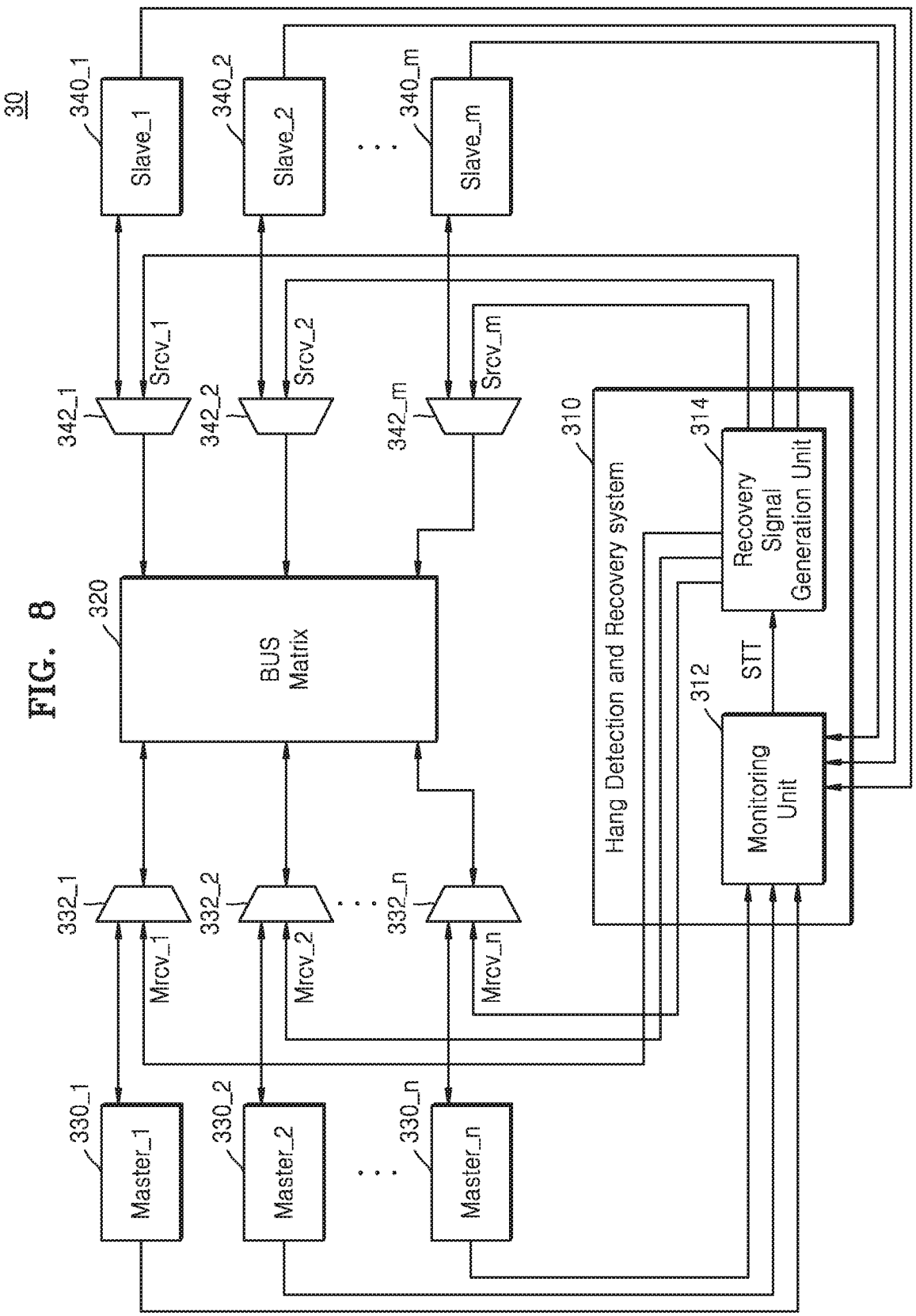
FIG. 8 is a block diagram of a semiconductor chip according to another example embodiment of the disclosure.

FIG. 8 is a block diagram of a semiconductor chip 30 according to another example embodiment of the disclosure.

Referring to FIG. 8, the master blocks 330_1 to 330_n and the slave blocks 340_1 to 340_m may output status signals as separate signals from a request signal and a response signal, respectively. The description of other blocks of the semiconductor chip 30 will be brief, as they are similar to their counterparts illustrated in FIG. 2. FIG. 8 shows master multiplexers 332_1 to 332_n, slave multiplexers 342_1 to 342_m, a BUS matrix 320, and a hang detection and recovery system 310 having a monitoring unit 312 and a recovery signal generation unit 314. However, the disclosure is not limited thereto.

A monitoring unit 312 may receive status signals output from the master blocks 330_1 to 330_n or the slave blocks 340_1 to 340_m, respectively. The monitoring unit 312 may monitor whether a hang or stall has occurred in a transaction between at least one of the master blocks 330_1 to 330_n and at least one of the slave blocks 340_1 to 340_m based on the received status signals. For example, the monitoring unit 312 may determine whether a hang or stall has occurred between the master blocks 330_1 to 330_n and the BUS matrix 320 or between the slave blocks 340_1 to 340_m and the BUS matrix 320 based on the received status signals, and may distinguish a functional block that caused a hang or stall. The status signal, before at least one functional block of the master blocks 330_1 to 330_n or the slave blocks 340_1 to 340_m becomes inoperable or unresponsive, may include information for indicating that the corresponding functional block has become inoperable or unresponsive. The monitoring unit 312 may output the status information signal STT including information on whether or not a hang or stall has occurred and/or information about a hang or stall-causing functional block to a recovery signal generation unit 314.

Figure 9:
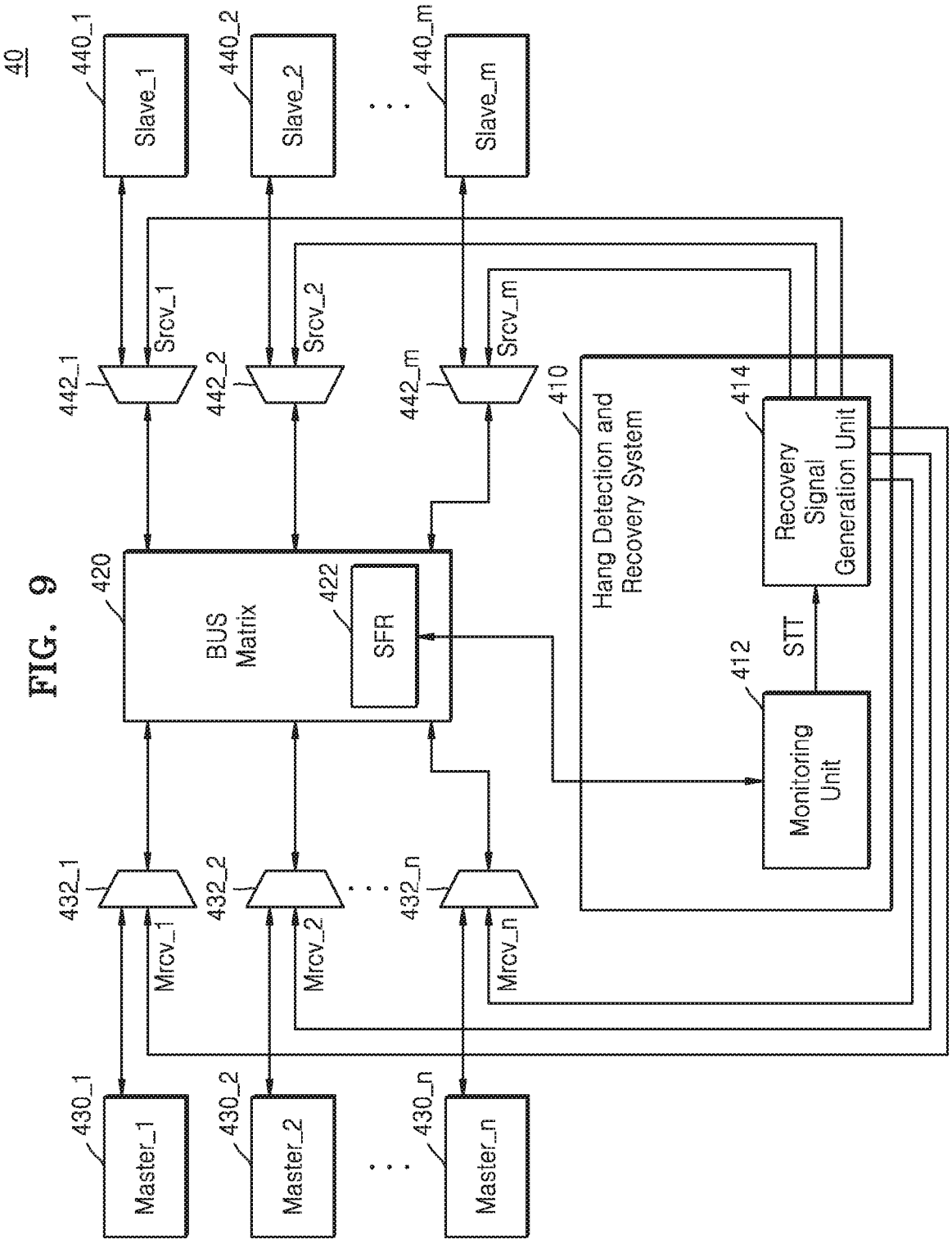
FIG. 9 is a block diagram of a semiconductor chip according to another example embodiment of the disclosure.

FIG. 9 is a block diagram of a semiconductor chip 40 according to another example embodiment of the disclosure.

Referring to FIG. 9, a BUS matrix 420 included in the semiconductor chip 40 may include a special function register 422. The description of other blocks of the semiconductor chip 40 will be brief, as they are similar to their counterparts illustrated in FIG. 2. FIG. 9 shows master blocks 430_1 to 430_n, master multiplexers 432_1 to 432_n, slave blocks 440_1 to 440_m, slave multiplexers 442_1 to 442_m, a BUS matrix 420, and a hang detection and recovery system 410 having a monitoring unit 412 and a recovery signal generation unit 414. However, the disclosure is not limited thereto.

The special function register 422 is a register included in a controller (not shown), and may control or monitor various functions of the controller. For example, the special function register 422 may be used as an input/output (I/O) control register, a timer, a stack pointer, a program counter, a return address register, a status register, a condition code register, and so on in the controller. In an example embodiment, the special function register 422 may provide control information of the controller to a monitoring unit 412.

The monitoring unit 412 may monitor whether a hang or stall has occurred in a transaction between at least one of the master blocks 430_1 to 430_n and at least one of the slave blocks 440_1 to 440_m based on the control information provided from the special function register 422. For example, the monitoring unit 412 may determine whether a hang or stall has occurred between at least one of the master blocks 430_1 to 430_n and the BUS matrix 420, or between at least one of the slave blocks 440_1 to 440_n and the BUS matrix 420, based on the control information provided from the special function register 422. Furthermore, the monitoring unit 412 may distinguish a functional block that caused a hang or stall based on the control information provided from the special function register 422. The monitoring unit 412 may output the status information signal STT including information on whether or not a hang or stall has occurred and/or information about a hang or stall-causing functional block to a recovery signal generation unit 414.

Figure 10:
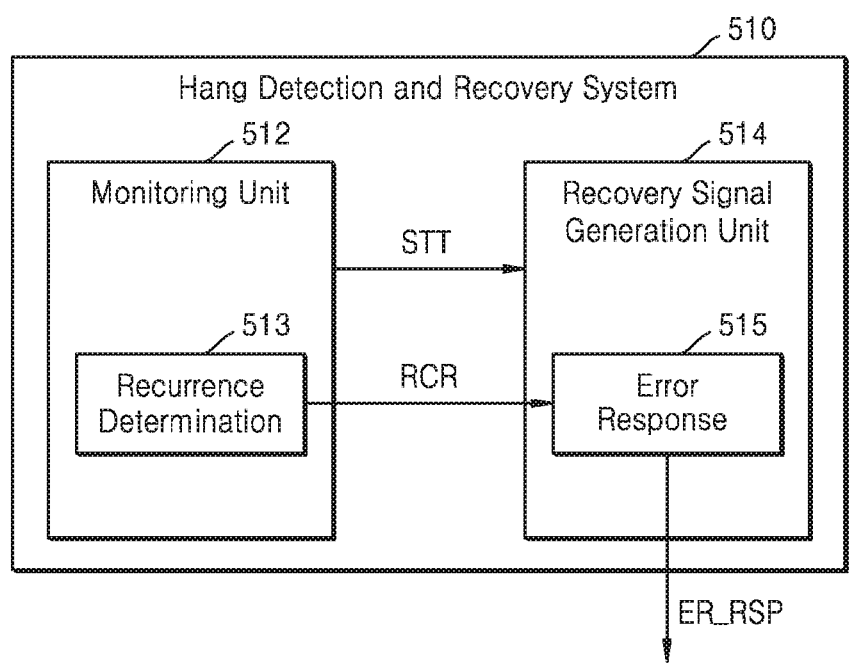
FIG. 10 is a block diagram of a configuration of a hang detection and recovery system, according to an example embodiment of the disclosure.

FIG. 10 is a block diagram of a configuration of a hang detection and recovery system 510, according to an example embodiment of the disclosure.

Referring to FIG. 10, the hang detection and recovery system 510 may include a monitoring unit 512 and a recovery signal generation unit 514, and the monitoring unit 512 may further include a recurrence determination unit 513 and the recovery signal generation unit 514 may further include an error response unit 515.

When at least one functional block from among the master blocks (for example, 130_1 to 130_n of FIG. 2) and the slave blocks (for example, 140_1 to 140_m of FIG. 2) causes a hang or stall, the recurrence determination unit 513 may determine whether the corresponding functional block caused a hang or stall again. In an example embodiment, the recurrence determination unit 513 may determine whether a hang or stall has recurred based on a history table for a hang or stall. In another example embodiment, the recurrence determination unit 513 may determine whether a hang or stall has recurred based on a flag signal regarding a hang or stall.

In an example embodiment, the recurrence determination unit 513 may provide the error response unit 515 with a recurrence information signal RCR. If the recurrence determination unit 513 determines that an arbitrary functional block caused a hang or stall again, the recurrence determination unit 513 may provide the error response unit 515 with the recurrence information signal RCR including corresponding information. In another example embodiment, the recurrence information signal RCR may be included in the status information signal STT.

When at least one functional block from among the master blocks (for example, 130_1 to 130_n of FIG. 2) and the slave blocks (for example, 140_1 to 140_m of FIG. 2) causes a hang or stall again, the error response unit 515 may limit an operation of the corresponding functional block. In more detail, when a hang or stall has recurred in an arbitrary functional block, the error response unit 515 may receive the recurrence information signal RCR including information about recurrence from the recurrence determination unit 513. The error response unit 515 may provide an error response signal ER_RSP to the functional block that caused a hang or stall again based on the recurrence information signal RCR. In an example embodiment, when the functional block that caused a hang or stall again is one of the master blocks (for example, 130_1 through 130_n of FIG. 2), the functional block may receive the error response signal ER_RSP and a transaction may be stopped.

Figure 11:
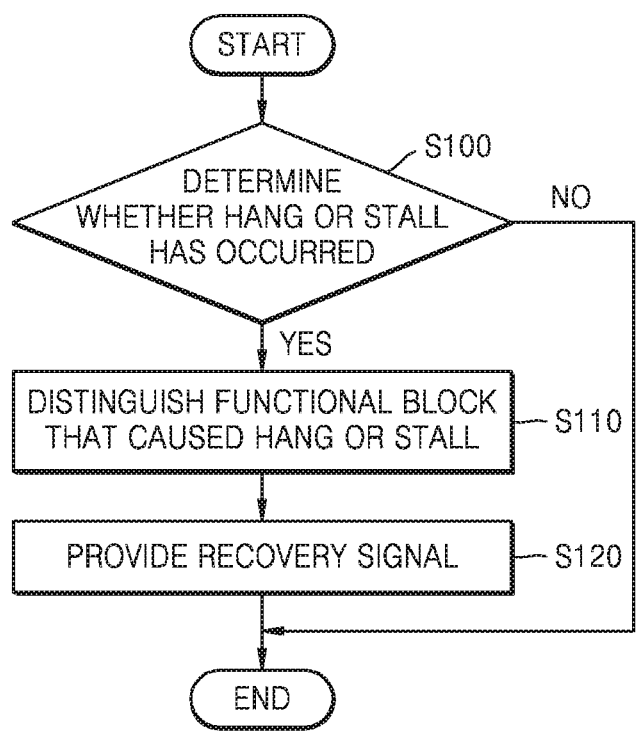
FIG. 11 is a flowchart of an operation of a semiconductor chip according to an example embodiment of the disclosure.

FIG. 11 is a flowchart of an operation of a semiconductor chip according to an example embodiment of the disclosure. FIG. 11 may be a flowchart of an operation of the semiconductor chip 10 of FIG. 2.

Referring to FIG. 11, in operation S100, it can be determined whether a hang or stall has occurred in a transaction between a plurality of functional blocks. The plurality of functional blocks may include, for example, the plurality of master blocks 130_1 to 130_n and/or the plurality of slave blocks 140_1 to 140_m. In an example embodiment, operation S100 of determining whether a hang or stall has occurred may be performed in the monitoring unit 112 included in the hang detection and recovery system 110. The monitoring unit 112 may monitor a request signal output from at least one of the master blocks 130_1 to 130_n or a response signal output from at least one of the slave blocks 140_1 to 140_m to determine whether a hang or stall has occurred.

In operation S110, if it is determined that a hang or stall has occurred, a functional block that caused a hang or stall may be distinguished. In an example embodiment, operation S110 of distinguishing a functional block that caused a hang or stall may be performed in the monitoring unit 112 included in the hang detection and recovery system 110. The monitoring unit 112 may distinguish a functional block that caused a hang or stall, e.g., based on a protocol of an interface included in the BUS matrix 120. In an example embodiment, the monitoring unit 112 may output the status information signal STT including information on whether or not a hang or stall has occurred and/or information about a hang or stall-causing functional block to the recovery signal generation unit 114.

In operation S120, after distinguishing a functional block that caused a hang or stall, a recovery signal may be provided to a target functional block of the corresponding functional block. In an example embodiment, operation S120 of providing the recovery signal may be performed in the recovery signal generation unit 114 included in the hang detection and recovery system 110. The recovery signal may be provided to the target functional block of the functional block that caused a hang or stall through, for example, the BUS matrix 120. In an example embodiment, based on the status information signal STT output from the monitoring unit 112, the recovery signal generation unit 114 may provide at least one of the master recovery signals Mrcv_1 to Mrcv_n or the slave recovery signals Srcv_1 to Srcv_m for releasing a hang or stall to the target functional block of the functional block that caused a hang or stall.

Figure 12:
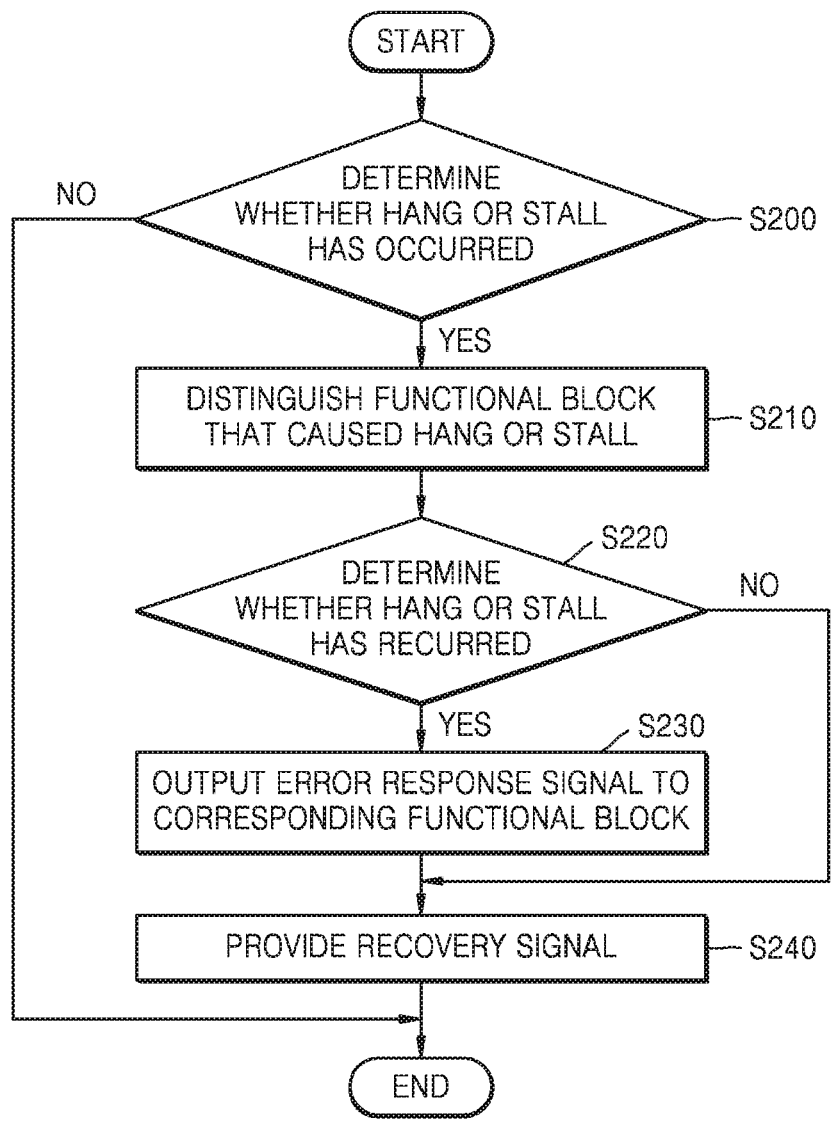
FIG. 12 is a flowchart of an operation of a semiconductor chip according to an example embodiment of the disclosure.

FIG. 12 is a flowchart of an operation of a semiconductor chip according to an example embodiment of the disclosure. FIG. 12 may be a flowchart for an operation of a semiconductor chip including the hang detection and recovery system 510 of FIG. 10.

Referring to FIG. 12, in operation S200, it is determined whether a hang or stall has occurred in a transaction between a plurality of functional blocks, and in operation S210, if it is determined that a hang or stall has occurred, a functional block that caused a hang or stall may be distinguished.

In operation S220, after distinguishing a functional block that caused a hang or stall, it may be determined whether the corresponding functional block caused a hang or stall again. In an example embodiment, operation S220 for determining whether a hang or stall has recurred may be performed by the recurrence determination unit 513 included in the monitoring unit 512. The recurrence determination unit 513 may provide the error response unit 515 with the recurrence information signal RCR including, e.g., information on whether or not a hang or stall has recurred. In operation S240, if it is not determined that a hang or stall has recurred, a recovery signal may be provided to a target functional block of a functional block that caused a hang or stall.

In operation S230, if it is determined that a hang or stall has recurred, an error response signal ER_RSP may be output to the corresponding functional block. In an example embodiment, operation S230 for outputting the error response signal ER_RSP may be performed in the error response unit 515 included in the recovery signal generation unit 514 based on the recurrence information signal RCR output from the recurrence determination unit 513. The error response signal ER_RSP may limit an operation of a functional block to which the corresponding signal is applied. In an example embodiment, when the error response signal ER_RSP is applied to one of the master blocks 130_1 to 130_n, the corresponding master block may stop a transaction. In operation S240, after the error response signal ER_RSP is output to a functional block that caused a hang or stall again, a recovery signal may be provided to a target functional block of the corresponding functional block. Operation S240 for providing the recovery signal may be performed in the recovery signal generation unit 514 included in the hang detection and recovery system 510.

Figure 13:
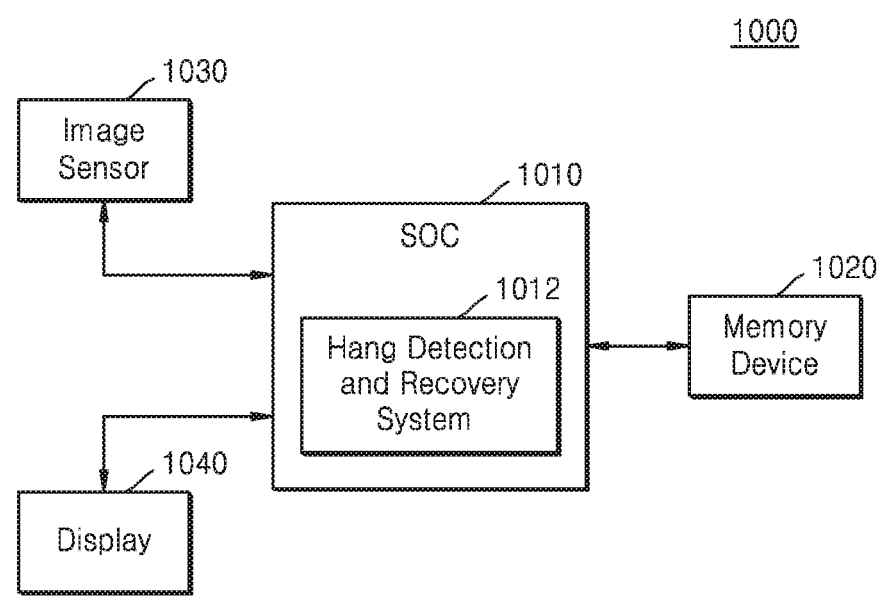
FIG. 13 is an exemplary block diagram of a data processing system including a System on Chip (SoC), according to an example embodiment of the disclosure.

FIG. 13 is an exemplary block diagram of a data processing system 1000 including an SoC, according to an example embodiment of the disclosure.

Referring to FIG. 13, the data processing system 1000 may be implemented as an image processing device, such as a digital camera or a mobile phone or a smart phone with a digital camera.

The data processing system 1000 may include an SoC 1010 and a memory device 1020 and the SoC 1010 may include a hang detection and recovery system 1012. In addition, the data processing system 1000 may further include an image sensor 1030 and a display 1040.

The image sensor 1030 may convert an optical image to digital image data and transmit the converted digital image data to the SoC 1010. In more detail, the converted image data may be transmitted to a memory controller (not shown) included in the SoC 1010.

The SoC 1010 may receive digital image data that is applied from the image sensor 1030. The digital image data may be displayed under the control of the SoC 1010 or stored in the memory device 1020. The digital image data stored in the memory device 1020 may be displayed by the display 1040 under the control of a memory controller (not shown). The SoC 1010 may generally control the data processing system 1000 and manage an operation of the memory controller. The memory controller may be embedded in the SoC 1010 or may be implemented as a device separate from the SoC 1010.

The data processing system 1000 may include the hang detection and recovery system 1012 in the SoC 1010. The hang detection and recovery system 1012 may release a hang or stall without transferring responsibility to functional blocks when a hang or stall has occurred according to an example embodiment of the disclosure. In addition, when a defect occurs in the memory device 1020, the image sensor 1030 and/or the display 1040, the hang detection and recovery system 1012 may shorten a development period of the data processing system 1000 by reducing the difficulty in performing debugging due to a hang or stall.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to example embodiments thereof, it will be understood that various changes in form and details may be made therein without departing from the spirit and scope of the following claims.

What is claimed is:
1. A system on chip (SoC) comprising:
a bus matrix configured to connect a plurality of functional blocks;
a monitoring unit configured to monitor whether a transaction between the functional blocks has a hang or stall and distinguish a functional block that caused the hang or stall from among the functional blocks;
a recovery signal generation unit configured to provide a recovery signal, which releases the hang or stall, to at least one of the functional blocks based on the distinguished functional block; and
a multiplexer having one end connected to the bus matrix and the other end connected to a first functional block, among the functional blocks, and the recovery signal generation unit, wherein the multiplexer is configured to output one of an output signal of the first functional block and a recovery signal output from the recovery signal generation unit to the bus matrix according to the distinguished functional block.

2. The SoC of claim 1, wherein the recovery signal generation unit is configured to provide the recovery signal to the at least one of the functional blocks through the bus matrix.

3. The SoC of claim 1, wherein the functional blocks comprise one or more master blocks and one or more slave blocks.

4. The SoC of claim 3, wherein when the monitoring unit distinguishes that one of the one or more master blocks is the functional block that caused the hang or stall, the recovery signal generation unit is configured to provide the recovery signal to a target slave block, among the one or more slave blocks, of the distinguished master block that caused the hang or stall.

5. The SoC of claim 3, wherein when the monitoring unit distinguishes that one of the one or more slave blocks is the functional block that caused the hang or stall, the recovery signal generation unit is configured to provide the recovery signal to a target master block, among the one or more master blocks, of the distinguished slave block that caused the hang or stall.

6. The SoC of claim 3, wherein the monitoring unit is configured to monitor a request signal output from at least one of the one or more master blocks or a response signal output from at least one of the one or more slave blocks to determine whether the hang or stall has occurred.

7. The SoC of claim 3, wherein:
each of the one or more master blocks and the one or more slave blocks is configured to output a status signal indicating whether the hang or stall has occurred, and
the monitoring unit is configured to determine whether the hang or stall has occurred based on the status signal.

8. The SoC of claim 3, further comprising:
a blocking unit configured to receive a request signal of a first of the one or more master blocks provided through the bus matrix and output the request signal to a first of the one or more slave blocks, wherein
the blocking unit is configured to block the request signal from being input to the first slave block when the first slave block is the distinguished functional block.

9. The SoC of claim 3, further comprising:
a logging block configured to log signals transmitted between the one or more master blocks and the one or more slave blocks, wherein
the logging block is configured to output logging information about signals transmitted between the one or more master blocks and the one or more slave blocks to the recovery signal generation unit.

10. The SoC of claim 9, wherein the recovery signal generation unit is configured to output the recovery signal to the at least one of the functional blocks based on the logging information.

11. The SoC of claim 1, wherein the monitoring unit is configured to further determine whether the functional block that caused the hang or stall causes the hang or stall again.

12. The SoC of claim 11, wherein:
the recovery signal generation unit further comprises an error response unit, and
the error response unit is configured to stop the transaction of the distinguished functional block when the distinguished functional block causes the hang or stall again.

13. A system interconnect comprising:
a channel configured to transmit a plurality of signals between one or more master blocks and one or more slave blocks;
a monitoring unit configured to determine whether a hang or stall has occurred in the channel and distinguish a functional block that caused the hang or stall from among the one or more master blocks and the one or more slave blocks; and
a recovery signal generation unit configured to provide a recovery signal, which releases the hang or stall, to a target functional block of the distinguished functional block; and
a multiplexer having one end connected to the channel and the other end connected to the recovery signal generation unit and a first functional block, among the one or more master blocks and the one or more slave blocks, wherein
the multiplexer is configured to output a: (1) communication signal received from the first functional block when the monitoring unit indicates the distinguished functional block is not the first functional block and (2) recovery signal received from the recovery signal generation unit to the channel when the monitoring unit indicates the distinguished functional block is the first functional block.

14. The system interconnect of claim 13, further comprising:
a logging block configured to log the signals, wherein
the logging block is configured to provide logging information about the signals to the recovery signal generation unit.

15. A system on chip (SoC) comprising:
a bus matrix that interconnects a plurality of functional blocks through dynamically configurable channels;
a monitoring device that detects an absence of an expected signal and identifies a source functional block, among the functional blocks, that was to communicate the expected signal to a target functional block, among the functional blocks;
a recovery device that communicates a recovery signal to the target functional block through a channel, within the bus matrix, in which the expected signal was to be communicated to the target functional block by the source functional block; and
a multiplexer having one end connected to the bus matrix and the other end connected to a first functional block, among the functional blocks, and the recovery device, wherein
the multiplexer is configured to output one of an output signal of the first functional block and a recovery signal output from the recovery device to the bus matrix according to the source functional block.

16. The SoC of claim 15, wherein the target functional block releases, in response to the recovery signal, the channel within the bus matrix for reconfiguration of a constituent component of the channel into another channel.

17. The SoC of claim 15, wherein:
each of the functional blocks is a processor, a dynamic memory access device, a universal serial bus, a memory, or a memory controller, and
all of the functional blocks exist within a single integrated circuit chip.

18. The SoC of claim 15, wherein:
the monitoring device further identifies a faulty functional block, among the functional blocks, that has caused the absence of multiple expected signals, and the recovery device communicates a fault signal to the faulty functional block indicating multiple fault occurrences, and the faulty functional block reduces communication with other functional blocks, among the plurality of functional blocks, in response to the fault signal.

19. The SoC of claim 15, wherein:

the first functional block is the source functional block, the recovery device communicates a path selection signal to the multiplexer interconnecting the source functional block with the bus matrix, and the multiplexer precludes the source functional block from communicating with the target functional block while the recovery signal is communicated to the target functional block through the channel.

* * * * *